United States Patent [19]

Saccocio

[11] Patent Number: 4,601,537
[45] Date of Patent: Jul. 22, 1986

[54] APPARATUS AND METHODS FOR FORMING IMAGES AND FOR OPTICAL DEMULTIPLEXING

[75] Inventor: Sean M. Saccocio, Columbus, Ohio

[73] Assignee: Ohio State University Research Foundation, Columbus, Ohio

[21] Appl. No.: 568,896

[22] Filed: Jan. 6, 1984

[51] Int. Cl.[4] .................. G02B 6/08; G02B 27/10; H04N 5/225
[52] U.S. Cl. .................. 350/96.27; 350/96.10; 350/96.24; 350/96.25; 350/330; 350/331 R; 350/334; 350/342; 370/1; 358/212; 358/225; 358/226; 358/901; 340/752; 340/763; 340/765
[58] Field of Search .............. 350/96.10, 96.16, 96.18, 350/96.24, 96.25, 96.26, 96.27, 96.28, 330, 331 R, 332, 333, 334, 335, 350 R, 350 F, 348, 349, 342; 370/1, 2, 3, 4; 250/227; 358/209, 212, 225, 226, 901; 340/752, 763, 765

[56] References Cited

U.S. PATENT DOCUMENTS

| | | | |
|---|---|---|---|
| 3,571,796 | 3/1971 | Brugger | 350/96.27 X |
| 3,666,881 | 5/1972 | Stein | 350/342 X |
| 3,829,684 | 8/1974 | Assouline et al. | 350/331 X |
| 3,944,817 | 3/1976 | Hilsum et al. | 250/227 X |
| 3,982,239 | 9/1976 | Sherr | 340/784 X |
| 4,299,447 | 11/1981 | Soltan et al. | 350/334 |
| 4,364,039 | 12/1982 | Penz | 340/784 |
| 4,432,610 | 2/1984 | Kobayashi et al. | 350/334 X |

FOREIGN PATENT DOCUMENTS 2833539 2/1980 Fed. Rep. of Germany ........ 358/44

OTHER PUBLICATIONS

Soltan et al., "New Large-Area L.·C. Modular Displays", Information Display, 10/83, pp. 4-8.
Heartling, Electrooptic Ceramic Materials, J. Am. Ceram. Soc.
Carville Ltd., Technical Description, TD 831027 ISS 01 (1983) reprinted from Engineering Magazine.
Kasahara et al, "A Liquid-Crystal Display . . . ", IEEE Transactions on Electronic Devices, ED-28, No. 6, Jun. 1981, pp. 744-748.
Young et al, "SSAM: Solid-State Automated Microscope", IEEE Transaction on Biomedical Engineering, BME-29, No. 2, Feb. 1982, pp. 70-80.
Shoemaker et al, "An Ultrafast Laser Scanner Microscope for Digital Image Analysis", IEEE Transactions on Biomedical Engineering, BME-29, No. 2, Feb. 1982, pp. 82-91.

Primary Examiner—Eli Lieberman
Assistant Examiner—Brian M. Healy
Attorney, Agent, or Firm—Sidney W. Millard

[57] ABSTRACT

An apparatus for illuminating and forming an image of a specimen has a transparent specimen-supporting surface and a fiber-optic bundle divided into illumination fibers which illuminate the surface and emission fibers which are held in the same relative spatial orientation throughout their length so that they produce an image of a specimen on the surface. This image may be analyzed by an optical demultiplexer using a light gate in which groups of input pixels are associated with a single output pixel, the light gate being switchable between various light-transmission states in each of which only one of the input pixels in each groups is allowed to transmit to the output pixel, so that the light gate effectively divides a single image comprising a large number of pixels into a series of images each containing fewer pixels. This enables a single photodetector chip to produce electronic signals representing an image having a much larger number of pixels than the number of separate photodetectors on the chip.

18 Claims, 4 Drawing Figures

APPARATUS AND METHODS FOR FORMING IMAGES AND FOR OPTICAL DEMULTIPLEXING

BACKGROUND OF THE INVENTION

This application relates to apparatus and methods for forming images and for optical demultiplexing. The apparatus and methods of the invention are primarily, though not exclusively, intended for imaging and analyzing images of tissue specimens. However, the instant apparatus and methods may also be useful in a variety of situations in which it is desired to employ fiber optics.

It has long been known that useful information can be obtained regarding living and dead cells by staining these cells with various dyes. One recent development in this area is cytofluorometry. In this technique, cells are stained with a fluorescent dye. The stained cells are then illuminated with light of a wavelength which will cause the dye to fluoresce and the resulting fluorescence is measured. (Throughout this application, the term "light" is used to mean any electromagnetic radiation which can be passed through optical devices such as fiber-optic bundles and lenses. Thus, the term "light" as used herein includes visible light and portions of the infra-red and ultra-violet regions, but does not cover electromagnetic radiation which cannot be handled by optical devices e.g. radio waves or gamma rays. Terms such as "illumination", "photodetector" and "photosensitive" are to be construed in a corresponding manner.)

In prior art cytofluorometric techniques, measurement of fluorescence has been achieved by dispersing dye-treated cells in a suitable liquid medium and passing the mixture of cells and liquid along a capillary tube through a beam of light having a wavelength capable of exciting fluorescence by a laser.

The beam is directed at right angles to the axis of the capillary tube and fluorescence detectors are arranged at right angles to both the axis of the tube and the exciting beam. The fluorescence emission signals detected by the fluorescence detectors are processed and analyzed for storage and display/readout purposes in a multichannel pulse-height analyzer, thus providing information concerning the frequency distribution of fluorescence intensity in a randomly dispersed cell population.

One serious disadvantage of this type of apparatus is that, since a mass of cells to be analyzed must be dispersed in a liquid medium before analysis and since the apparatus only analyzes fluorescence from one cell at a time, all spatial information regarding the relative positions of the various cells in the original mass is lost, and thus it is not possible to tell whether or not the original tissue was homogeneous with respect to the fluorescent dye. For example, if the results of an analysis using such an apparatus show that the cells exhibit widely differing fluorescence, it is not possible to tell whether this variation is a random variation existing uniformly throughout the mass of cells being analyzed or whether the variation is correlated with the position of cells within the mass. It would be useful to retain this spatial information, since there are convincing scientific reasons to think that much of the variation in fluorescence detected in prior art cytofluorometric techniques is in fact due to the position of the cells within the tissue. Accordingly, there is a need for an apparatus and method for cytofluorometric analysis of tissue specimens which will preserve spatial information regarding the position of the cells within the tissue mass during analysis, and this invention seeks to provide such an apparatus and method.

This invention also seeks to provide a solution to a further problem involved in tissue analysis. Cytofluorometric analysis is often employed to gather information concerning the reactions of various tissues to drugs; for example, the technique may be used to monitor the absorption of chemotherapeutic drugs by cancerous tumors. If one wishes to be able to use cytofluorometry to follow the behavior of drugs in tumors, it is necessary to be able to observe fluorescence over the whole cross-section of the tumor i.e. it is necessary that analysis be conducted over an area of up to about 50 mm. square. Furthermore, it will normally be necessary to obtain a resolution approximately equal to or better than the size of a typical cell (which is typically about 25 microns in diameter in mammals). Analysis of an image 50 mm. square with a resolution of 25 microns requires a field of $2000 \times 2000$, or 4 million, pixels. Mere visual inspection of the image produced is inadequate for quantitative analysis and thus it is necessary in most cases to digitize the image on a gray tone scale and thereafter analyze the digital form of the image using various conventional statistical techniques on an automatic data processor. Integrated circuits (usually known as "chips") are already available which can receive an image on a photosensitive surface and generate analog signals corresponding to each pixel of the image received on the photosensitive surface. The analog signals generated by these chips are then passed through a conventional analog/digital converter to produce a digitized form of the image which is stored for later analysis. Unfortunately, the largest such photodetector chips presently available only have about 200000 pixels on their photosensitive surfaces. Although it might at first appear that analysis of a 4 million pixel image could be achieved by mounting about such 20 photodetector chips in an appropriate array, the use of such an array of chips would have serious disadvantages. Firstly, since 200000 pixel chips cost at least $2000 each, use of as many as 20 such chips greatly increases the cost of the apparatus. Secondly, the need to provide appropriate pin connectors and the like for the chips means that chips cannot simply be abutted against one another without leaving unanalyzed areas of image between the fields of view of the various photosensitive surfaces. To overcome this problem, it would be necessary to provide elaborate arrangements to fragment the image of the tissue being analyzed into small portions which would fall on the photosensitive surfaces of the various chips and even then, given the very small size of the pixels, alignment of the chips is expected to be exceedingly difficult.

Several state-of-the art instruments have been described in the scientific literature which are designed to provide images of fields of less than 0.1 cm$^2$ at any particular time. To the best of my knowledge, all of the previously described imaging systems incorporate some type of mechanically operated component (such as pivot mounted mirrors, prisms, and similar optical components). Alternatively, instruments have been described which mechanically transport the target material through an image sampling field. All of these mechanically coupled imaging instruments are susceptible to problems associated with maintenance of alignment and structural tolerances, as well as isolation of the instrument from vibrations produced internally and from those introduced by the environment.

Thus, there is a need for an apparatus and method which will permit generation of an electronic form of a 4 million pixel image without requiring the use of multiple photodetector chips. This invention seeks to provide such an apparatus and method.

SUMMARY OF THE INVENTION

In one aspect this invention provides apparatus for illuminating and forming an image of a specimen, this apparatus comprising a planar transparent surface for supporting the specimen and a fiber-optic bundle. One end (hereinafter referred to as the specimen end) of each fiber in the bundle is disposed adjacent the surface used for supporting the specimen. The fibers in the bundle are divided into illumination fibers and emission fibers. The non-specimen ends of the illumination fibers are brought adjacent one another at an illumination locus spaced from the specimen-supporting surface so that these non-specimen ends of the illumination fibers can be illuminated by a light source. The non-specimen ends of the emission fibers are brought adjacent one another at an emission locus which is spaced from both the specimen-supporting surface and the illumination locus. The relative spatial orientations of the non-specimen ends of the emission fibers at the emission locus are substantially the same as the relative spatial orientations of the specimen ends of the emission fibers. Thus, the emission fibers preserve spatial information regarding the distribution of light emitted by a specimen resting on the surface and produce an image of the specimen.

In another aspect, this invention provides a method for forming an image of a specimen, this method comprising supporting the specimen on a planar transparent surface; a fiber-optic bundle has a specimen end of each of its fibers disposed adjacent this surface. The fibers in the fiber-optic bundle comprise illumination fibers and emission fibers; the non-specimen ends of the emission fibers are brought adjacent one another at an emission locus, the relative spatial orientations of the emission fibers at the emission locus being substantially the same as those of the specimen ends of the emission fibers, so that the emission fibers can preserve spatial information regarding the distribution of light emitted by the specimen resting on the surface. Light is introduced into the non-specimen ends of the illumination fibers, thereby causing this light to pass along the illumination fibers, illuminate the specimen and cause light to be emitted therefrom, and part of the emitted light is passed along the emission fibers, thereby forming an image of the specimen at the emission locus.

In another aspect, this invention provides an optical demultiplexer, this apparatus comprising a light gate having first and second surfaces. The second surface bears a plurality of output pixels, while the first surface bears a plurality of groups of input pixels, each of these groups of input pixels comprising at least first and second input pixels and each of the groups being associated with one of the output pixels. The apparatus also comprises means for projecting light onto the first surface of the light gate and control means for controlling light transmission through the light gate, this control means being capable of switching the light gate between a first state, in which the light gate permits transmission of light from each of the first input pixels to its associated output pixel but does not permit transmission of light from the second input pixels to their associated output pixels, and a second state, in which the light gate permits transmission of light from each of the second input pixels to its associated output pixel but does not permit transmission of light from its first input pixels to their associated output pixels.

Finally, this invention provides a method of demultiplexing an image, this method comprising forming the image on the first surface of a light gate which also has a second surface; this second surface bears a plurality of output pixels and the first surface bears a plurality of groups of input pixels, each of the groups of input pixels comprising at least a first and a second input pixel and each of the groups of input pixels being associated with one of the output pixels. The light gate is placed in a first state in which transmission of light occurs from each of the first input pixels to its associated output pixel but transmission of light does not occur from the second input pixels to their associated output pixels. The light gate is then switched to a second state in which transmission of light occurs from each of the second input pixels to its associated output pixel but transmission of light does not occur from the first input pixels to their associated output pixels.

DETAILED DESCRIPTION OF THE INVENTION

As will be apparent from the foregoing summary of the invention, this invention encompasses two different types of apparatus and methods. The instant apparatus for illuminating and forming an image comprising a specimen-supporting surface and a fiber-optic bundle will sometimes hereinafter be referred to for brevity as the "illuminating apparatus" of the invention and the method for its use as the "illuminating method" of the invention. Similarly, the instant method for analyzing an image using a light gate together with light projection means and control means for the light gate will sometimes hereinafter be referred to as the "analyzing method" of the invention.

As already mentioned, the instant illuminating apparatus comprises a specimen-supporting surface and a fiber-optic bundle having illumination fibers for illuminating a specimen on the surface and emission fibers for gathering light emerging from a specimen on the surface. The specimen-supporting surface may be the surface of a separate, transparent support member separate from, but disposed adjacent, the specimen end of the fiber-optic bundle, or the specimen-supporting surface may simply be the surface of the specimen end of this bundle, the bundle being cut so as to provide a suitable flat surface for supporting specimens. For the practical reasons already discussed above, it is desirable that the surface be capable of supporting a specimen at least 5 centimeters in diameter. Furthermore, if the apparatus is to be used for examination of tissues, it is very desirable that it have a resolution not less than that of the cells constituting the tissue. Since mammalian cells vary in size from about 5 to about 50 microns, and since the resolution of an image produced by an optic-fiber bundle is limited by the size of the individual fibers within the bundle, it is thus desirable that the individual optic fibers have dimensions of not more than 100 microns, and preferably not more than 50 microns. Obviously, the use of even finer fibers, say 5 to 10 microns, may be desirable in many cases.

The fibers used in the fiber-optic bundle may be the conventional round fibers or they may be the square fibers which have recently become available. The use of square fibers has the advantage that they can be packed more closely, so that less of the light emerging from the specimen will be lost in the gaps between adjacent emission fibers. Whichever type of fiber is used, it is very desirable that the specimen ends of both the illumination and emission fibers be disposed substantially normal to the specimen-supporting surface.

The arrangement of the specimen ends of the illumination and emission fibers within the fiber-optic bundle can vary, and it is not essential that there be an equal number of the two types of fibers. Thus, one possible arrangement of the specimen ends of the fibers is one in which the specimen end of each illumination fiber is surrounded by a plurality of specimen ends of the emission fibers so that no two specimen ends of the illumination fibers lie immediately adjacent one another. For example, if round fibers are used with the specimen ends of the fibers arranged on a (hexagonal) close-packed lattice, the specimen ends of the fibers could be arranged so that each illumination fiber is surrounded by six emission fibers. Alternatively, if square fibers arranged on a square lattice are being used, alternate fibers on alternate rows of the lattice might be illumination fibers so that each illumination fiber is surrounded by eight emission fibers. However, since the optic-fiber bundle has to be assembled by placing the specimen ends of separate fibers in an appropriate arrangement while bringing the opposed ends of the fibers into the separate arrays formed by the illumination and emission fibers (and, at least in the case of the emission fibers, preserving the correct relative spatial orientations of the various fibers to produce a proper image of the specimen), the aforementioned arrangements of the specimen ends of the illumination and emission fibers are somewhat tedious and difficult to construct. Accordingly, although the arrangement may lead to some loss of definition in the image of the specimen, it is usually preferable to arrange the specimen ends of the fibers on a lattice such that the specimen ends of illumination and emission fibers are arranged on different lines of the lattice, preferably on alternating lines of the lattice.

Optical fibers individually possess a light gathering capacity which is described by a parameter which is called the numerical aperture (NA). The NA for typical fibers ranges from approximately 0.2 to 0.8 dependent upon the material from which the fibers are made. Optical lenses, in comparison, have NA values of less than 0.2 in applications which require imaging areas of 20 $cm^2$ or more. An optical fiber faceplate of 20 $cm^2$ surface area typically can have 2-16 times the light gathering capacity of a lens system which is designed to form a single image of an equivalent area (this is based upon the ratio of the mathematical squares of the respective NA values). Therefore, the use of optical fiber faceplates to gather light from a wide target field is as efficient or more efficient than an equivalent optical lens system.

The instant illuminating apparatus is intended to be used in conjunction with a source of light which supplies light to the non-specimen ends of the illumination fibers, thereby illuminating the specimen. The source of light is conveniently a laser, preferably an argon laser, since most of the fluorescent dyes developed for use in cytofluorometry fluoresce well under this light. Similarly, the instant illumination apparatus is intended to be used with a photodetector array disposed adjacent the non-specimen ends of the emission fibers for receiving light emerging from the emission fibers and for producing signals representative of the light intensity in differing regions of the image formed by the emission fibers. In order to achieve maximum resolution, it is desirable that the photodetector array be capable of producing separate signals representative of the light emerging from each of the emission fibers. The preferred forms of photodetector array are discussed in more detail below with reference to the instant optical demultiplexer.

Figure 1:
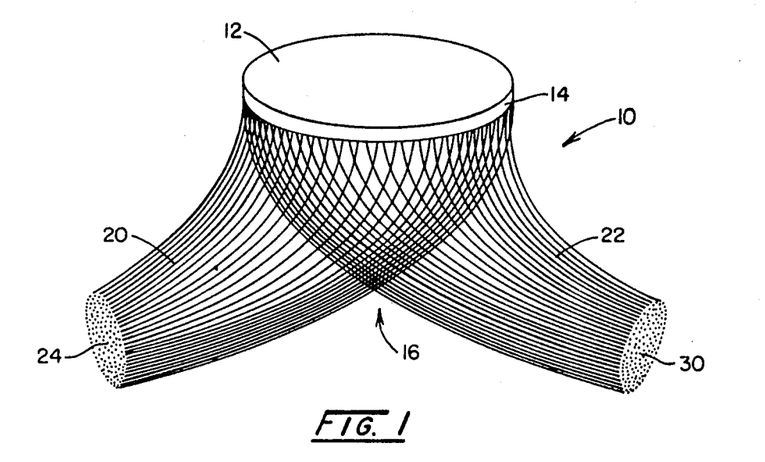
FIG. 1 is a perspective view of an apparatus of the invention for illuminating and forming an image.
Figure 2:
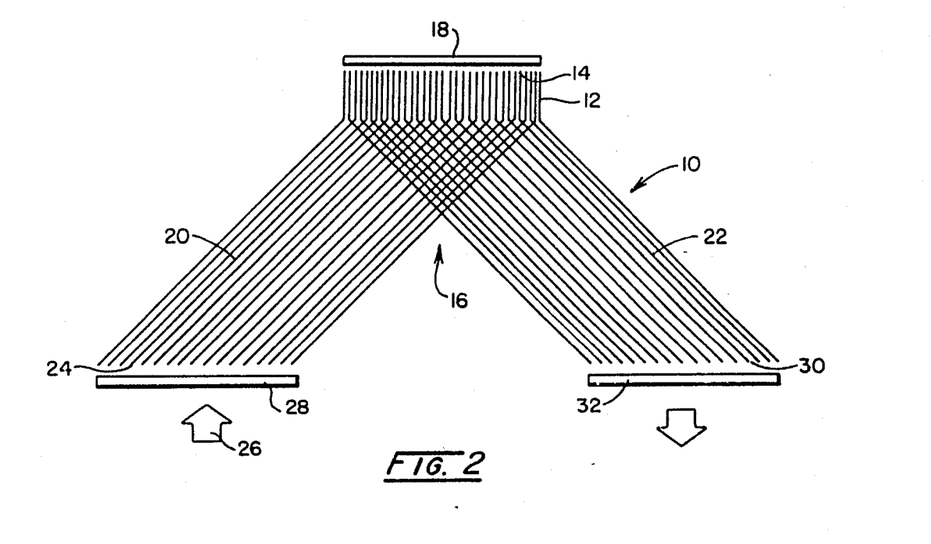
FIG. 2 is a schematic side elevation showing the apparatus shown in FIG. 1 together with certain auxiliary apparatus used in connection therewith.

The illuminating apparatus of the invention shown in FIGS. 1 and 2 and generally designated 10 has a specimen-supporting surface 12 which is circular. This specimen-supporting surface 12 is actually the upper surface of a fused fiber stage 14 made by fusing together the upper (or specimen) ends of the fibers in a fiber-optic bundle (generally designated 16). The fused fiber stage 14 is shown in FIG. 2 with a specimen in the form of a section of tissue 18 resting thereon; this specimen is omitted from FIG. 1 for the sake of clarity.

The fibers in the bundle 16 are divided into illumination fibers 20 and emission fibers 22. The non-specimen ends of the illumination fibers 20 are brought adjacent one another at an illumination locus 24 to form a flat surface. A laser 26 and a lens 28 are arranged to supply light to this flat surface. It should be noted that, although in the instant illuminating apparatus it is essential that the emission fibers be arranged so as to retain their relative spatial orientations between their two ends, it is not absolutely necessary that the illumination fibers retain the same relative spatial orientations between their two ends since, if it is only desired to secure uniform illumination of the specimen 18, uniform illumination of the flat surface at the illumination locus 24 will produce uniform illumination of the specimen regardless of whether the arrangement of the illumination fibers preserves their relative spatial orientations between their two ends or not. However, it is generally desirable that the illumination fibers preserve their relative spatial orientations as between their two ends in order to allow for illumination of only selected parts of the specimen.

The non-specimen ends of the emission fibers 22 are brought adjacent one another at an emission locus 30 spaced from both the specimen-bearing surface 12 and the illumination locus 24. As already mentioned, the arrangement of the illumination fibers is such as to preserve the correct relative spatial orientations between the two ends of the emission fibers so that light emerging from the non-specimen ends of the emission fibers will produce an image of the specimen. A photodetector array 32 is indicated schematically in FIG. 2 adjacent the emission locus 30; as explained in more detail below, in most practical situations simple placement of a photodetector array immediately adjacent the emission locus is not possible and more complicated techniques for analysis of the image of the specimen produced by the emission fibers is necessary.

It should be noted that, as best seen in FIG. 2, the specimen ends of both the illumination and emission fibers are fused together in the stage 14 in such a way that both sets of fibers lie normal to the stage 14. This ensures that the illumination of a specimen upon the stage 14 is truly epitaxial and also reduces to a minimum the amount of exciting light which is reflected into the emission fibers. In cytofluorometry, the exciting light is much stronger than the fluorescence and thus it is desirable to reduce to a minimum the amount of the exciting light which enters the emimssion fibers. If the amount of light entering the emission fibers is still sufficient to interfere with measurement of the fluorescence, an appropriate filter may be provided (for example, between the emission locus 30 and the photodetector array 32) to block the unwanted exciting light.

The instant optical demultiplexer provides a means by which an image comprising a large number of pixels may be demultiplexed into a series of images each comprising many fewer pixels. (In certain applications of the instant optical demultiplexer, the "image" on the first surface of the light gate may not be an image of a real object. For example, the instant optical demultiplexer could be used to establish communication between two optic-fiber bundles having differing numbers of fibers. If these fiber-optic bundles are being used for binary data transmission rather than for image transmission, the "image" on the first surface of the light gate will merely comprise an assembly of black and white pixels representing binary digits and not corresponding to any real object. However, for convenience, the term "image" will be used to denote the pattern of light and dark areas projected onto the first surface of the light gate whether or not this "image" corresponds to that of a real object.) To this end, the image to be analyzed is formed on the first surface of a light gate, this first surface being divided into a plurality of groups of input pixels. Each of these groups of input pixels is associated with an output pixel and a control means is provided by which the light gate can be stepped through a number of light transmission states equal to the number of input pixels in each group. In each transmission state, the light gate allows transmission from one of the input pixels in each group to its associated output pixel but does not allow transmission of light from any of the other input pixels in each group to the output pixels; the input pixel in each group transmitting light to the associated output pixel is different in each light transmission state of the light valve. Thus, for example, if there are twenty input pixels in each group, the control means will step the light gate through twenty different light transmission states. In the first such state, only the first input pixel in each group is allowed to transmit light to its associated output pixel, in the second light transmission state only the second input pixel in each group is allowed to transmit light through its associated output pixel and so on. Thus, by the time the control means has stepped the light gate through all twenty states, each of the input pixels has been allowed to transmit light to its associated output pixel.

The effect of thus stepping the light gate through its twenty light transmission states is to divide the image on the first surface of the light gate into twenty separate images appearing successively on the second surface of the light gate, each of these twenty images having only one-twentieth of the number or pixels in the original image. Thus, for example, an original image having 4 million pixels could be divided into twenty separate images each having only 200,000 pixels. Since, as already mentioned, photodetector chips already exist which have a photosensitive surface comprising approximately 200,000 pixels and which are capable of producing a separate analog signal corresponding to the light intensity reaching each of these pixels, the instant analyzing apparatus allows a single such chip to analyze an original image comprising four million pixels. As explained above, without the instant analyzing apparatus, analysis of such a four million pixel image would require a very expensive and complicated array of chips with various auxiliary apparatus. Thus, the instant optical demultiplexer greatly simplifies the analysis of images containing very large numbers of pixels. Moreover, in contrast to the mechanically coupled imaging instruments described above, the instant apparatus does not incorporate any mechanically coupled components and is, therefore, free of the problems attendant upon the use of such mechanical components.

The light projection means used to produce the image on the first surface of the light gate in the instant optical demultiplexer is conveniently a fiber-optic bundle, desirably a fiber-optic faceplate. This fiber-optic bundle may be the bundle of emission fibers from an instant illumination apparatus, but it should be understood that the instant optical demultiplexer need not be used with the instant illuminating apparatus. For example, if it is desired to adapt the instant optical demultiplexer for analysis of images which are much larger than the first surface of the light gate, one or more lenses may be used to produce a reduced image on the first surface of the light gate. Where the image on the first surface is produced by a fiber-optic bundle, it is desirable that the fibers in this bundle be of substantially square cross-section and be arranged on a square lattice, with the input and output pixels of the light gate also arranged on square lattices. Since the pixels of commercially-available photodetector chips are arranged on square or rectangular lattices, the square lattice of output pixels will thus match the lattice of the pixels on the photodetector chip, and much less information will be lost than if the fiber-optic bundle uses the hexagonal packed lattice characteristic of fiber-optic bundles formed of round fibers.

From the foregoing description of the mode of operation of the instant optical demultiplexer, it will readily be seen that the greater the number of input pixels in each group, the greater the number of pixels can be present in the image on the first surface of the light gate for any given photodetector chip used to receive the light from the output pixels of the light valve. For practical purposes, it is normally desirable that there be at least 9 input pixels in each of the groups and in practice 16, 20, or 25 input pixels arranged in a 4×4, 4×5 or 5×5 arrangement is probably best suited to most situations. Although of course the time necessary to completely record the image on the first surface of the light gate using any particular photodetector chip is equal to the time necessary for the photodetector to scan its own photosensitive surface, multiplied by the number of input pixels in each group, in a most practical applications the time taken to scan the whole image is not a serious problem. Commercially available photodetectors can scan their entire photosensitive surface of about 200,000 pixels in less than 50 milliseconds, so that such a chip is capable of complete analysis of an image comprising 4 million pixels using the instant optical demultiplexer is less than one second, a scan time which is sufficiently small even for most biological specimens when it is desired to observe changes in a living specimen with time.

To control the transmission of light from the input pixels to the output pixels, a variety of optical devices capable of being electrically switched between a light-transmitting and a non-light-transmitting state may be employed. For example, devices formed of potassium or ammonium dihydrogen phosphate or of cadmium lead telluride may be employed for this purpose. However, some of these materials require relatively large electric potentials, ranging up to several thousand volts, to effect switching between their transmitting and non-transmitting states, and, given that a typical instant optical demultiplexer will require hundreds of thousands of small switching devices in the light gate, there are substantial difficulties in providing reliable insulation capable of allowing such high potentials to such large numbers of switching devices within a small space. Accordingly, it is preferred that the light gate of the instant analyzing apparatus use s solution of nematic liquid crystals, since switching of such nematic liquid crystal solutions can be achieved with potentials of only a few volts and thus there is little difficulty in providing adequate insulation between adjacent switching devices.

Until recently, the only type of liquid crystal switching devices available had a plurality of strips arranged side by side, each of these strips being independently switchable between light-transmitting and non-light-transmitting modes. Since the input pixels within each group of the instant optical demultiplexer will normally be arranged on a two dimensional lattice (usually a rectangular lattice) if it is desired to use this type of "linear" liquid crystal switching device with this arrangement of input pixels, it is necessary to use two such linear liquid crystals switching devices arranged with their strips at right angles to one another (or at some other appropriate angle if the lattice on which the input pixels are arranged is not rectangular). It is believed to be apparent to those skilled in the art that, by superimposing two linear devices in this manner, the devices can be arranged to transmit the light from any desired pixel on a rectangular lattice while simultaneously blocking light from all other pixels.

However, there have been recently become available single-layer liquid crystal devices having independently switchable sections arranged on a rectangular grid, and it is preferred to use such single-layer devices in this invention.

Although the instant optical demultiplexer has other uses (for example it may be used to establish communication between two fiber optic bundles having differing numbers of fibers and used for transmission of data) the instant optical demultiplexer is, as already indicated, primarily intended for use with a photodetector having a photosensitive surface and capable of producing signals representative of the intensity of light impinging upon different regions of the photosensitive surface. One commercially available form of photodetector chip useable with the instant analysis apparatus is the Fairchild CCD222, manufactured by Fairchild Camera & Instrument Co., 3440 Hillview Avenue, Palo Alto, Calif. 94304. When used in conjunction with such a photodetector, it is necessary to dispose a fiber-optic bundle adjacent the second surface of the light gate. It is preferred that this fiber-optic bundle be in the form of a fiber-optic faceplate. The fiber-optic bundle or faceplate adjacent the second surface of the light gate avoids loss of information between the second surface of the light gate and the photodetector surface. Most if not all, commercially available photodetector chips are constructed so that only part of the photosensitive surface is actually photosensitive. For example, in the aforementioned Fairchild CCD222 the individual photosensitive pixels have dimensions of 12 microns along the horizontal scan axis and 18 microns along the vertical scan axis. These individual elements are arranged in columns along the vertical scan axis with substantially no gap between adjacent elements, but along the horizontal scan axis there is interposed between each adjacent pair of element columns an opaque aluminum register shield 18 microns wide. If an image of the second surface of the gate a light gate is formed on such a photodetector chip without the interposition of a fiber-optic bundle, the separation between adjacent columns of detecting elements may cause some of the output pixels to completely miss the photosensitive elements. By interposing a fiber-optic bundle or faceplate, preferably one using square fibers of appropriate dimensions, between the second surface of the light gate and the photodetector chip such information loss can be avoided since the individual fibers within the bundle or faceplate average the light entering the fiber over the entire area of the fiber so that none of the output pixels miss the detecting elements. Other imaging means (such as lenses) can if desired be interposed between the fiber-optic bundle and the photodetector chip; such additional imaging means may be useful if, for example, it is desired to effect a change in the size of the image produced on the photodetector chip.

It is believed that the necessary electrical connections and components needed to arrange for proper stepping of the light gate through its various light transmission states by the control means will be apparent to those skilled in the art. In particular, those skilled in the art of image analysis will appreciate that, when the instant optical demultiplexer is being used in conjunction with a photodetector chip and an analog/digital converter to supply a digitized form of the image to an automatic data processor for analysis, it will be necessary for the automatic data processor to receive not only the digitized video output from the photodetector chip, but also a signal representative of the state of the light gate; since each photosensitive element on the chip receives, and produces a signal representative of, several different input pixels, and thus several different areas of the specimen, as the light gate is stepped through its various light transmission states, identification of the precise area of the specimen responsible for any particular piece of data requires that the automatic data processor know not only which of the photosensitive elements on the chip is responsible for that piece of data, but also the light transmission state of the light gate when the piece of data was generated. Appropriate coordination between the light gate and the automatic data processor is most conveniently achieved by providing a synchronization controller which steps the control means through its light transmission states, the signals from the synchronization controller being fed not only to the control means but also to the automatic data processor. Appropriate forms of synchronization controller will readily be apparent to those skilled in the art.

Figure 3:
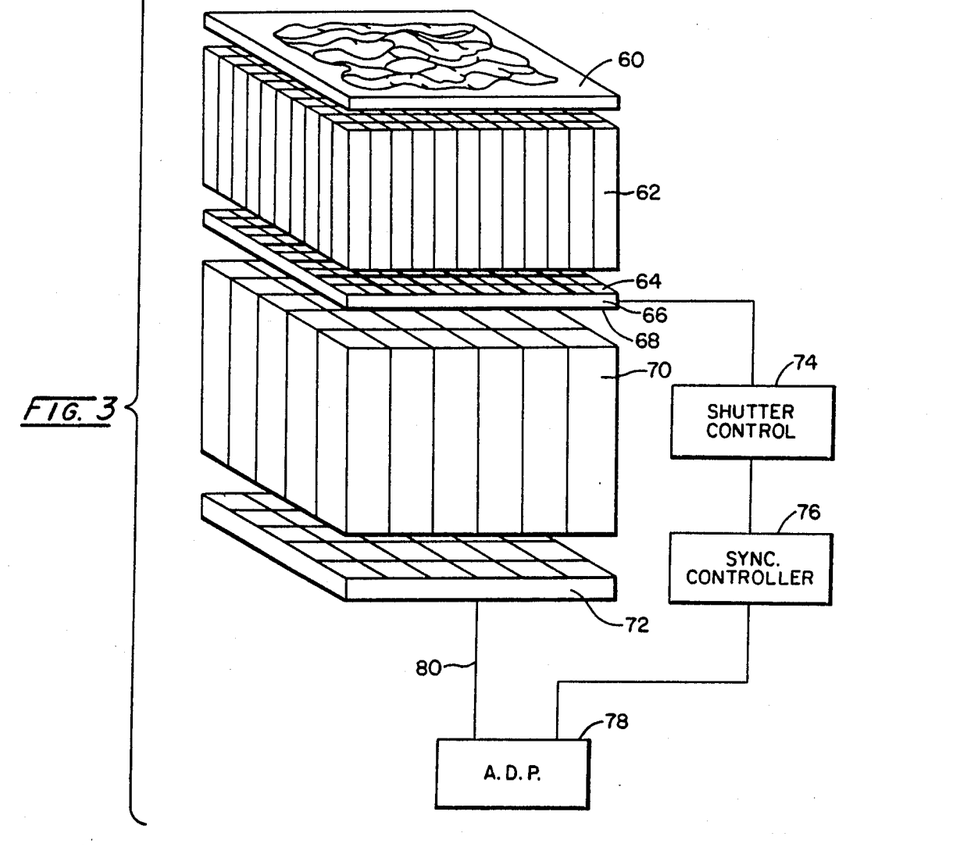
FIG. 3 is a schematic exploded view of a first optical demultiplexer of the invention.

FIG. 3 of the accompanying drawings shows schematically an instant analysis apparatus together with associated equipment. As shown in FIG. 3, an image of a specimen 60 is formed by means of a fiber-optic faceplate 62 on the first, upper surface 64 of a light gate in the form of a liquid crystal shutter 66. (The arrangement of specimen and fiber-optic faceplate shown in FIG. 3 is purely for purposes of illustration and a wide variety of methods may be used for forming an image of the specimen 60 on the surface 64 of the shutter 66. For example, this image could be formed using the instant illumination apparatus shown in FIGS. 1 and 2, with the bundle of emission fibers 22 replacing the fiber-optic faceplate 62 and with the surface 64 of the shutter 66 positioned adjacent the emission locus 30 of the instant illumination apparatus.) If the apparatus is to be used for cytofluorometry with the exciting light being transmitted through the specimen (i.e. with the exciting light impinging upon the top of the specimen 60 in FIG. 3) a filter may be interposed between the specimen 60 and the faceplate 62 to filter out the exciting wavelength and ensure that only fluorescent light reaches the shutter 66.

The faceplate 62 comprises 120 square cross-section fibers arranged on a 12×10 square lattice. (The numbers of fibers in the faceplate 62, the further faceplate described below and the number of pixels, also described below, on the two surfaces of the shutter 66 are of course purely for purposes of illustration; any useful embodiment of the invention would in practice require a much greater number of fibers and pixels.) Similarly, the upper surface 64 of the shutter 66 is divided into 120 input pixels arranged in a 12×10 array so that the light from each of the fibers in the faceplate 62 falls on a single input pixel. The input pixels on the surface 64 are divided into thirty groups of four pixels, each group comprising a 2×2 array of pixels, as shown by the heavy lines on the surface 64 in FIG. 3; as will be apparent to those skilled in the art, these heavy lines are only provided for purposes of illustration and the grouping of the pixels is in fact determined by electronic means.

The second, lower surface 68 of the shutter 66 is divided into thirty output pixels (not shown) arranged in a 6×5 array so that each output pixel lies directly below one of the groups of input pixels on the surface 64. Adjacent the surface 68 lies a second fiber-optic faceplate 70 having thirty fibers arranged in a 6×5 array so that one of the fibers is associated with each of the output pixels on the surface 68. Below the faceplate 70 lies a photodetector chip 72 having thirty photosensitive elements arranged in a 6×5 array so that one photosensitive element is associated with each fiber in the faceplate 70.

A shutter control 74, the operation of which is described below, controls the operation of the shutter 66. The shutter control is itself controlled by a synchronization controller 76 which supplies pulses at regular, predetermined intervals. The signals from the synchronization controller 76 are supplied not only to the shutter control 74 but also to a data processor 78, which also receives the video output from the photodetector chip 72 via a line 80.

The operation of the instant analyzing apparatus shown in FIG. 3 is as follows. The specimen 60 is first illuminated with suitable light (if the apparatus is being used for cytofluorometry the light used must of course comprise light having the correct wavelength to cause fluorescence of the dye being employed). An image of the specimen 60 is formed by the faceplate 62 on the upper surface 64 of the shutter 66. The shutter control 74 steps the shutter 66 at predetermined intervals controlled by the synchronization controller 76 through four different light transmission states. In each of these states, only one of the input pixels on the surface 64 is allowed to transmit light to the associated output pixel on the surface 68, and the pixel allowed to transmit is different in each state. For example, in the first light transmission state the upper left-hand input pixel (in FIG. 3) in each group of four pixels might e allowed to transmit light to the associated output pixel on the surface 68, while transmission from the other three pixels in each group is blocked. In the second light transmission state, light would be transmitted from the upper right-hand input pixel in each group, in the third state from the lower left-hand pixel and in the fourth state from the lower right-hand pixel. Thus, as the shutter control 74 steps the shutter 66 through its four light transmission states, although the 120 pixel image of the specimen on the surface 64 remains constant, four separate 30-pixel images of the specimen appear on the lower surface 68 of the shutter 66. These four images are transmitted to the photodetector array by the faceplate 70. Upon receiving these four successive 30-pixel images, the photodetector chip 72 will transmit four corresponding video signals along the line 80 to the data processor 78. (As already mentioned, most commercially available photodetector chips actually produce an analog representation of the image appearing on the photosensitive surfaces, so that it is necessary to interpose an analog/digital converter between the photodetector chip and the digital data processor which is normally used for analyzing the data. This analog/digital converter is omitted from FIG. 3 for the sake of clarity.) Since the data processor 78 also receives the signals from the synchronization controller 76, it is advised which of the four transmission states the shutter 66 is in when it receives each of the four sets of signals from the photodetector chip 72, and is thus advised which of the 120 pixels on the surface 64 is responsible for the generation of each individual signal which it receives from the photoconductor chip 72. The data gathered by the data processor 78 can then be analyzed in a conventional manner.

For ease of illustration, FIG. 3 is drawn with the specimen 60, the faceplates 62 and 70, the shutter 66 and the photodetector chip 72 all of the same size. In practice, the various parts of the apparatus illustrated in FIG. 3 will differ in size; as already mentioned, in a typical instant analysis apparatus the specimen 60 may be up to 50 mm. square, whereas the photosensitive surface of a typical commercially available photodetector chip, such as the aforementioned Fairchild CCD222 chip is about 10 mm. square. Thus, to enable an image of appropriate size to be produced upon the photodetector chip, reduction in size of the image must be effected at some stage during the transmission of light through the apparatus. A variety of techniques may be used to reduce the size of the image; for example, a lens might be introduced between the faceplate 70 and the chip 72, or between the shutter 66 and the faceplate 70, or at other locations. However, the most convenient technique for reducing the size of the image is tapering the fibers within the faceplate 70 so that the lower ends (in FIG. 3) of these fibers are substantially the same size as the individual photodetector elements on the chip 72, while the upper ends of these fibers are substantially the same size as the output pixels on the shutter 66. Alternatively, similar tapering of the fibers within the faceplate 62 could be employed, but this would also reduce the size of the input pixels on the surface 64 and given that, even without such tapering of the fibers in the faceplate 62 the input pixels will only typically be about 25 microns square, any tapering of the fibers in the faceplate 62 may lead to difficulties in constructing sufficiently small switching elements in the shutter 66.

Those skilled in the art will appreciate that, because of changes in refractive indices, some light-scattering will occur at the interfaces between the specimen 60 and the faceplate 62, the faceplate 62 and the shutter 66, the shutter 66 and the faceplate 70 and the faceplate 70 and the photodetector chip 72. Those skilled in the art will appreciate that, if this light scattering becomes so pronounced that the performance of the apparatus is adversely affected, such light scattering can be reduced by placing a material of appropriate refractive index (such as the oil conventionally used with oil-immersion microscope lenses) at the various interfaces. Alternatively, loss of light by scattering at interfaces may be reduced by fusing various components of the apparatus together so as to create solid/solid interfaces where little or no change in refractive index occurs. Such solid/solid interfaces will of course cause much less light scattering than would occur if a layer of air lay between the two adjacent components of the apparatus, since in the latter case solid/air and air/solid interfaces, both of which involve a great change in refractive index, would be present. For example, the fiber faceplate 70 could be mounted directly upon the photodetector chip 72; a modification of the aforementioned Fairchild CCD222 chip having such a fiber faceplate directly attached to its photosensitive surface is now becoming available as the Fairchild CCD3000. In addition, modern techniques for construction of arrays of nematic liquid crystals may, in some cases, permit construction of the light gate 66 directly upon the upper end (in FIG. 3) of the faceplate 70 so as to eliminate the layer of air which would otherwise be present between these two components.

Figure 4:
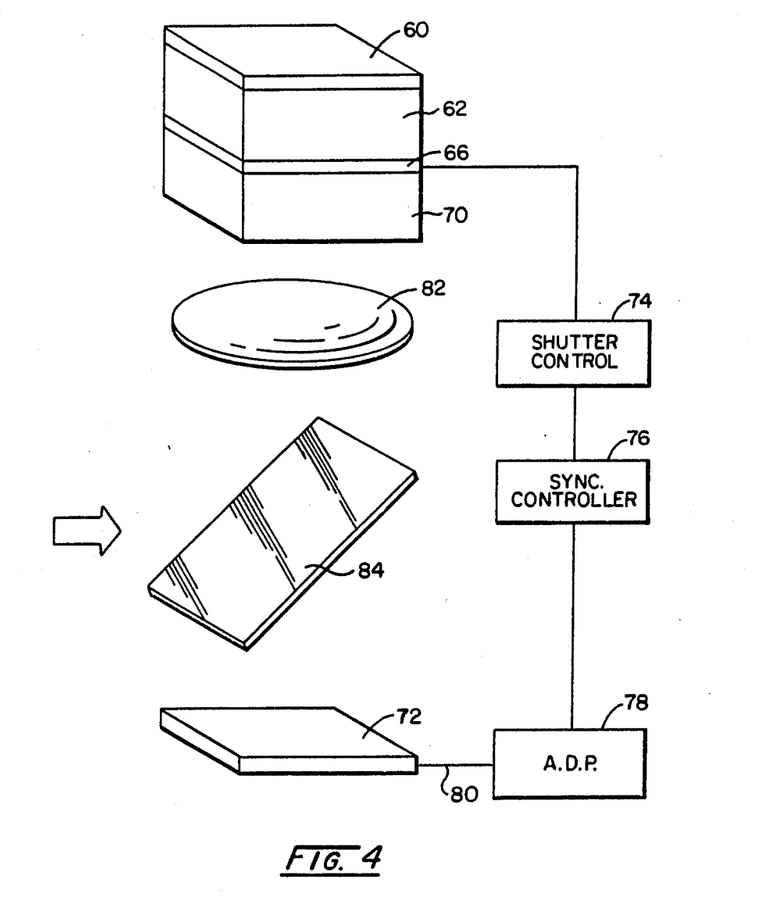
FIG. 4 is a schematic perspective view of a second optical demultiplexer of the invention.

FIG. 4 shows schematically an instant optical demultiplexer generally similar to that shown in FIG. 3 but modified to permit expitaxial illumination of the specimen. In FIG. 4, a specimen 60, faceplate 62, liquid crystal shutter 66, faceplate 70, shutter control 74 and synchronization controller 78 are arranged in the same relative positions and function in substantially the same manner as in the apparatus shown in FIG. 3. However, in the apparatus shown in FIG. 4, the face of the faceplate 70 remote from the shutter 66 does not lie adjacent the photodetector chip 72; instead, a lense 82 and a dichroic mirror 84 are disposed between the lower (in FIG. 4) face of the faceplate 70 and the chip 72 to permit expitaxial illumination of the specimen 60 without the use of an illumination apparatus such as that shown in FIGS. 1 and 2. A light source 86, preferably an argon laser, is arranged to direct light onto the dichroic mirror 84 which reflects the light through the lens 82 and the faceplate 70 onto the second surface 68 of the shutter 66. The light is transmitted from each output pixel on the second surface 68 to the input pixel in each group of such pixels on the first surface 64 which is in optical communication with the output pixel (depending of course upon the light transmitting state of the shutter 66) and thence via the faceplate 62 to the specimen 60. Fluorescent light emitted by the specimen passes back through the faceplate 62, the shutter 66, the faceplate 70 and the l;ens 82 to the dichroic mirror 84. A portion of this fluorescent light passes straight through the mirror 84 to the chip 72.

Thus, it will be seen that, in contrast to the instant illumination apparatus shown in FIGS. 1 and 2, the apparatus shown in FIG. 4 achieves epitaxial illumination of the specimen without requiring separate bundles of illumination and emission fibers; in the apparatus shown in FIG. 4, the fibers in the faceplates 62 and 70 serve as both illumination and emission fibers since they both convey illuminating light to the specimen and convey fluorescent light from the specimen to the photodetector chip.

It will be apparent to those skilled in the art that numerous changes and modifications can be made in the embodiments of the invention described above without departing from the scope of the invention. Accordingly, the foregoing description is to be construed in an illustrative and not in a limitative manner, the scope of the invention being defined solely by the appended claims.

I claim:
1. An optical demultiplexer comprising:
   (a) a light gate having an input first surface and an output second surface which are fixed relative to each other and subdivided into a two dimensional array of pixels, each of said pixels of said gate being switchable between a relatively translucent, light transmitting, on state and a relatively opaque light blocking, off state;
   (b) means for projecting information bearing light onto the input, first surface of the light gate;
   (c) a light detector having a two dimensional array of input pixel elements, each detector pixel element optically associated with and receiving light from a group of gate output pixels; and
   (d) control means for controlling light transmission through the pixels of the light gate, said control means simultaneously turning on one pixel of each group and cycling in sequence through the pixels of each group.

2. An optical demultiplexer according to claim 1 wherein said light projection means comprises a fiber-optic bundle extending from adjacent an object, of which an image is to be formed on said first surface, to adjacent said first surface.

3. An optical demultiplexer according to claim 2 wherein said fiber-optic bundle comprises a fiber-optic faceplate.

4. An optical demultiplexer according to claim 2 wherein said fibers of said fiber-optic bundle are of substantially square cross-section and are arranged on a square lattice, and wherein said input pixels are arranged in a square lattice.

5. An optical demultiplexer according to claim 1 wherein there are at least nine input pixels in each of said groups.

6. An optical demultiplexer according to claim 1 wherein said light gate comprises a plurality of nematic liquid crystals.

7. An optical demultiplexer according to claim 1 wherein the light detector comprises a photodetector having a photosensitive surface and a fiber-optic bundle, said bundle being disposed between said second surface of said light gate and said photosensitive surface for purposes of forming an image of said second surface of said light gate on said photosensitive surface, said photosensitive surface being capable of providing signals representative of the intensity of any light impinging upon differing regions of said photosensitive surface.

8. Apparatus according to claim 7 wherein said fiber-optic bundle comprises a fiber-optic faceplate.

9. An optical demultiplexer according to claim 7 wherein said fiber-optic bundle comprises at least one fiber for each of said output pixels of said light gate, and wherein said photosensitive surface has at least one of said regions associated with each of said second output pixels and is thus capable of producing separate signals representative of the intensities of light emerging from each of said output pixels.

10. An improved method for coupling an optical image to an optical image detector, the method being of the type wherein the image detector receives the image on a two dimensional array of detector pixel elements and wherein the improvement is a demultiplexing method which provides a pixel resolution substantially grater than the pixel resolution of the detector, said method comprising:
 (a) projecting the image light onto the input first surface of a light gate having a two dimensional array of pixels which can be switched between on and off states to control the pixel light transmission to an output second surface of the light gate, the light gate having substantially more pixels than the detector;
 (b) directing the light from each of a plurality of different groups of light gate pixels onto a different one of the detector pixel elements so that each detector pixel element receives light from all the light gate pixels of a different group; and
 (c) simultaneously turning on one light gate pixel of each group and cycling in sequence through all the pixels of each group.

11. A method according to claim 10 wherein said image on said first surface of said light gate is formed by means of a fiber-optic bundle terminating adjacent said first surface.

12. A method according to claim 11 wherein said fiber-optic bundle comprises a fiber-optic faceplate.

13. A method according to claim 11 wherein said fibers of said fiber-optic bundle are of substantially square cross-section and are arranged on a square lattice, and wherein said input pixels are arranged in a square lattice.

14. A method according to claim 10 wherein there are at least nine input pixels in each of said groups and wherein said methods comprises switching said light gate through a number of states equal to the number of input pixels in each of said groups, each of said states allowing transmission of light from only one of said input pixels in each of said groups to its associated detector pixel and each of said states allowing said transmission from a different input pixel in each of said groups.

15. A method according to claim 10 wherein said light gate comprises a plurality of nematic liquid crystals and wherein said switching is effected by varying the electric field applied to said nematic liquid crystals.

16. A method according to claim 10 further including the step of forming on a photosensitive surface of a photodetector an image of said second surface of said light gate by means of a fiber-optic bundle disposed between said second surface of said light gate and said photosensitive surface, said photodetector being capable of producing signals representative of the intensity of light impinging upon differing regions of said photosensitive surface.

17. A method according to claim 16 wherein said fiber-optic bundle comprises a fiber-optic faceplate.

18. A method according to claim 16 wherein said fiber-optic bundle comprises at least one fiber for each of said output pixels of said light gate and wherein said photosensitive surface has at least one of said regions associated with each of said output pixels and is thus capable of producing a separate signal representative of the intensity of any light emerging from each of said output pixels.

* * * * *